Nov. 20, 1945.                A. A. HEJDUK                2,389,508
                                MANOMETER
                         Filed July 19, 1944          2 Sheets-Sheet 1

INVENTOR.
Arthur A. Hejduk
BY
Evans + McCoy
ATTORNEYS

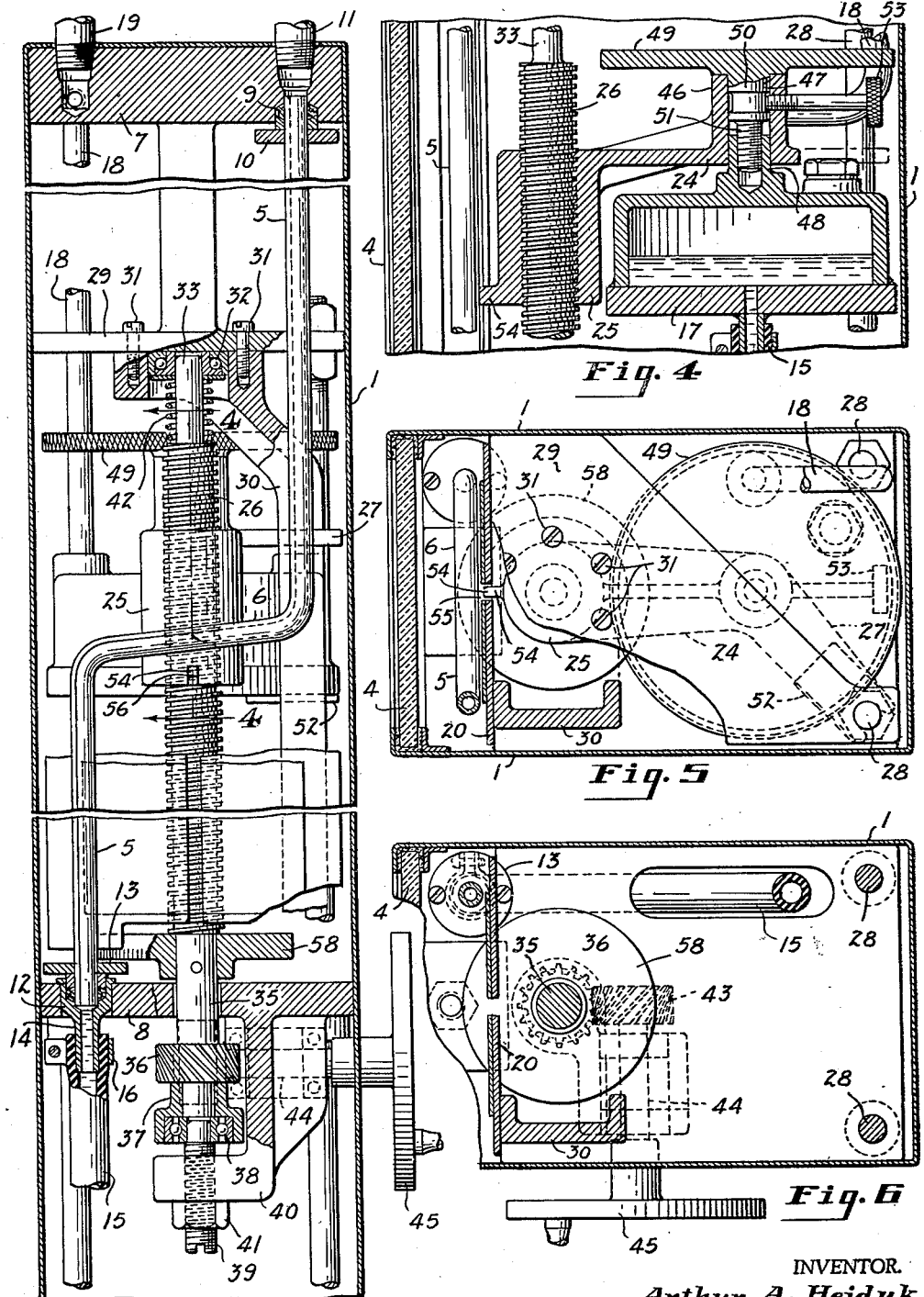

Patented Nov. 20, 1945

2,389,508

UNITED STATES PATENT OFFICE 2,389,508

MANOMETER

Arthur A. Hejduk, Cleveland, Ohio, assignor to The Meriam Instrument Company, Cleveland, Ohio, a corporation of Ohio Application July 19, 1944, Serial No. 545,594

16 Claims. (Cl. 73—401)

This invention relates to manometers and more particularly to a means of obtaining a very exact measurement of pressures.

The present invention has for its object to provide a manometer by means of which extremely accurate measurements of pressure are obtained by readings of liquid level in a tube inclined at a small angle to the horizontal and by means of which accurate measurement of pressures throughout a relatively wide range may be quickly and easily made.

The device of the present invention is a manometer of the well type in which the manometer tube has vertical portions connected by an intermediate portion that is inclined at a small angle to the horizontal together with the mechanism for affecting relative vertical travel between the well and tube so as to bring the meniscus of the liquid column back to alinement with a zero mark associated with the inclined portion of the tube and for measuring such vertical movement to ascertain the pressure.

In addition it is an object of the invention to provide means independent of the mechanism for causing relative travel of the well and tube for effecting small vertical adjustments in the relative positions of the tube and well so that the pressure will be correctly measured by the relative movement of the well and tube necessary to bring the top of the liquid column back to the zero point.

A further object of the invention is to provide suitable scales alongside vertical portions of the manometer tube by means of which a direct reading of pressures may be made without relative adjustment of the tube and well.

A further object of the invention is to provide an adjusting screw for effecting the relative linear travel of the tube and well which has a pitch that is an aliquot part of a unit space between graduations on a vertical scale positioned to measure relative movements of the tube and well and to provide the screw with means for indicating fractional turning movements thereof.

With the above and other objects in view, the invention may be said to comprise the device as illustrated in the accompanying drawings hereinafter described and particularly set forth in the appended claims together with such variations and modifications thereof as will be apparent to one skilled in the art to which the invention pertains.

Reference should be had to the accompanying drawings forming part of this specification in which;

Fig. 3 is a front elevation on an enlarged scale with portions of the scale plates and housing wall broken away to show elements within the housing;

Fig. 4 is a section taken on the line indicated at 4—4 in Fig. 3;

Fig. 5 is a section taken on the line indicated at 5—5 in Fig. 2; and

Fig. 6 is a section taken on the line indicated at 6—6 in Fig. 2.

Figure 1:
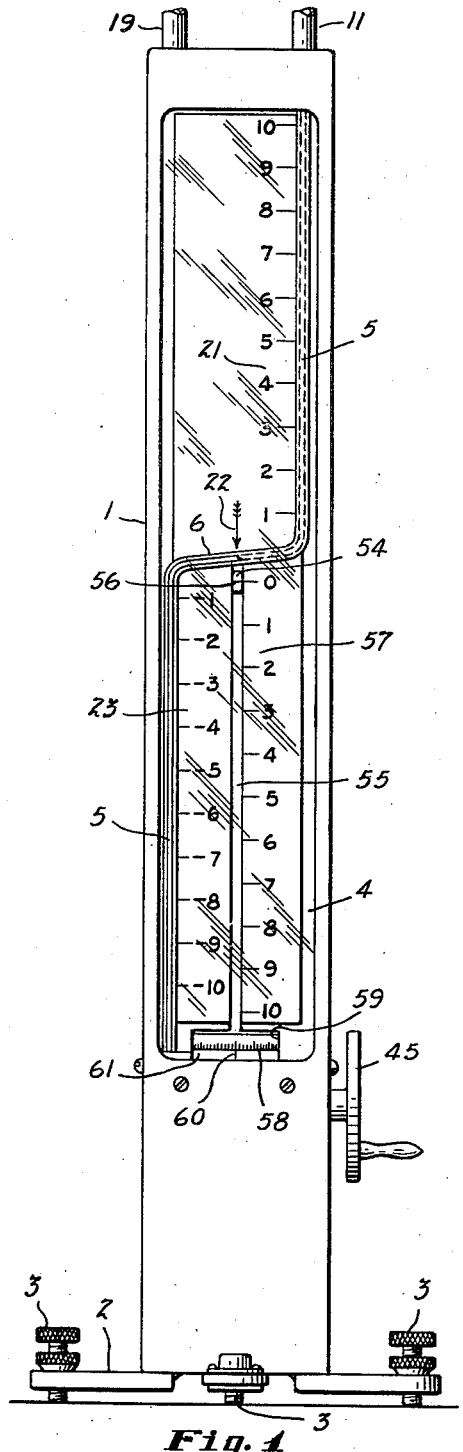
Fig. 1 is a front elevation of a manometer embodying the invention.
Figure 2:
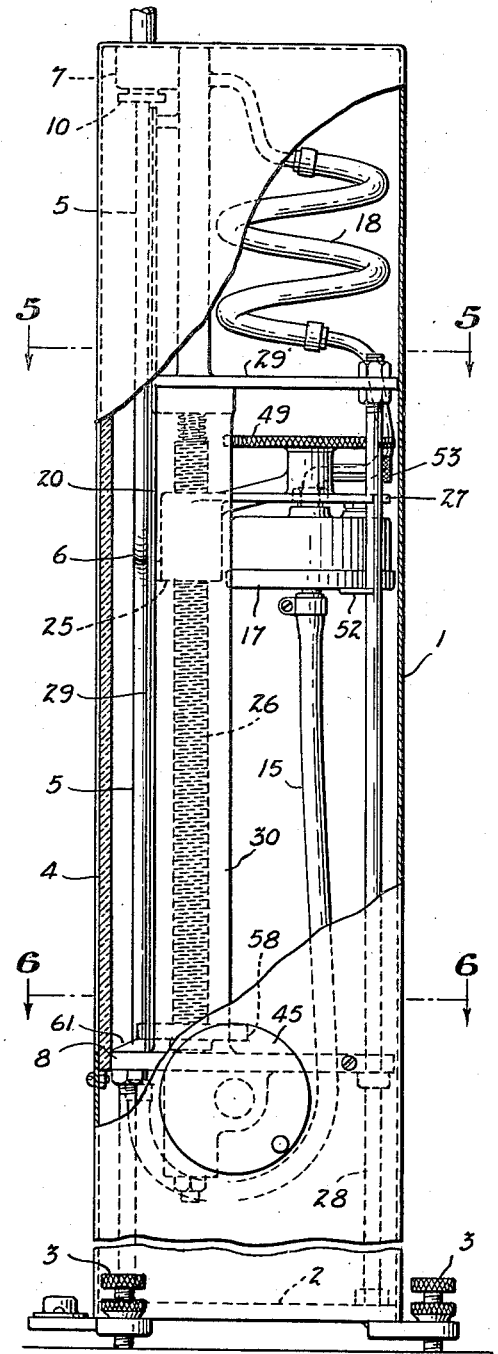
Fig. 2 is a side elevation of the manometer with a portion of the housing wall broken away to show movable parts within the housing.

Referring to the accompanying drawings the manometer of the present invention is mounted within an elongated vertical housing 1 which has a base portion 2 provided with feet 3 that screw into the base portion 2 and that may be adjusted to plumb the housing. The front of the housing is provided with a glass panel 4 and immediately adjacent the panel 4 there is mounted a transparent manometer tube 5 that has laterally offset vertical upper and lower portions and an inclined intermediate portion 6 that is disposed at a small inclination to the horizontal. The upper and lower ends of the tube 5 are attached to top and bottom supporting members 7 and 8 that are fixed portions of the housing. The top member 7 has an opening 9 to receive the upper end of the tube 5 and this opening is sealed around the tube 5 by means of a gland 10. A pressure pipe 11 may be connected to the upper end of the opening 9. The lower end of the tube 5 extends into a fitting 12 mounted in the bottom member 8, a suitable gland 13 being provided to make a fluid tight connection between the tube and fitting. The fitting 12 extends through the member 8 and has a reduced lower end 14 to which a flexible tube 15 is connected by means of a clamp 16. The tube 15 may be composed of rubber or other flexible material and serves to connect the manometer tube 5 with a suitable well 17. A flexible tube 18 is connected to the top of the well 17 and extends from the well 17 to the top member 7 where it is connected to a suitable pressure pipe 19.

Behind the tube 5 and in a fixed position with respect thereto there is a suitable scale plate 20 which has a scale 21 extending alongside the upper portion of the tube 5 above the inclined portion 6 thereof, the plate 20 being also provided with an indicia such as an arrow 22 above the center of the inclined portion 6 of the tube which serves as the zero point of the scale 21. A second graduated scale 23 may be positioned alongside the lower portion of the tube 5, this scale also having its zero point at the point indicated by the arrow 22. If the well 17 is positioned so as to aline the meniscus of the liquid column in the tube 5 with the arrow 22 when the pressure on the column and the pressure on the liquid in the well is the same, the displacement of the liquid column which is the measure of the fluid pressure acting on the liquid may be read directly on the scale 21 or 23.

However, the main object of the present invention is to so employ the inclined portion 6 of the tube as to obtain more accurate pressure readings than are possible with a vertical tube. To this end means is provided for effecting relative vertical travel between the well and tube so that the top of the liquid column may be brought back to the zero point 22 by such relative movement after the liquid column has been displaced by pressure. If the well and tube are initially so adjusted so that the meniscus of the liquid column is alined with the point 22 when the pressure is the same in the well and tube, applied pressures may be measured by measuring the relative linear movement of the tube and well necessary to bring the top of the liquid column back to the zero point. By reason of the very small angle of inclination of the portion 6 of the tube, slight vertical movements of the well with respect to the tube will cause a movement of the meniscus in the inclined portion 6 of the tube many times greater than the actual relative movement. The present invention provides means for accurately measuring the relative vertical movements of the tube and well necessary to bring the meniscus of the column back into the inclined portion 6 of the tube and into alinement with the zero point 22 so as to accurately determine the applied pressure.

In the manometer herein shown the relative vertical travel of the tube and well is accomplished by mounting the tube 5 and scale plate 20 in fixed position in the housing 1 and mounting the well 17 for vertical travel in the housing 1. The well 17 is mounted on a carrier 24 that is provided with a sleeve portion 25 that is interiorly threaded to receive a vertical screw 26. The carrier 24 has an arm 27 that slidably engages a vertical tie rod 28 so that the carrier is held against turning movements with respect to the screw 26 and is adapted to be moved up and down by rotation of the screw. The screw 26 is supported between the lower supporting member 8 and a fixed partition member 29 in the upper portion of the housing, the partition member 29 being supported in fixed position in the housing by means of tie rods 28 and by a standard 30 extending upwardly from the bottom member 8 and attached to the bottom of the partition member 29 by means of bolts 31. The upper end of the standard 30 is formed to receive a ball thrust bearing 32 in which the reduced upper end 33 of the screw 26 is journaled. The screw 26 has a reduced lower end 35 to which is attached a spiral gear 36 and beneath the gear 36 a collar 37 that has a ball thrust bearing 38 mounted therein that is supported on the upper end of a vertical adjusting screw 39. The screw 39 is threaded in a bracket 40 formed integral with the bottom member 8 and is held in adjusted position by means of a lock nut 41. The screw 26 is yieldingly pressed in a downward direction by means of a coil spring 42 surrounding the reduced upper end 33 of the screw. By means of the adjusting screw 39 the actuating screw 26 may be adjusted vertically to properly position the same for proper measurement of fractional turning movements as will be hereinafter explained. A spiral gear 43 is fixed to a horizontal shaft 44 that extends through a wall of the housing 1 and has a hand wheel 45 attached to its outer end. By turning the hand wheel 45 the screw 26 may be rotated to cause upward or downward travel of the well 17.

In order to properly position the well 17 with respect to the tube 5 without affecting the means for indicating the extent of travel of the well 17, means is provided for making small vertical adjustments of the relative positions of the well and tube independently of the screw 26. As herein shown this relative adjustment is effected by adjusting the well 17 on its carrier 24. As best shown in Fig. 4, the carrier 24 is provided with a boss 46 on its upper side that is provided with a central vertical bore 47 adapted to receive a cylindrical projection 48 formed on the top wall of the well 17. A hand wheel 49 is rotatably supported on the boss 46 and has a hub 50 fitting in the bore 47 which carries a threaded extension 51 that screws into a threaded opening in the projection 48. The well 17 is held against turning movements by a plate 52 attached thereto which slidably engages a tie rod 28. By turning the hand wheel 49 the well 17 is caused to move up or down with respect to the carrier 24 and, in order to lock the well in adjusted position with respect to the carrier 24, a set screw 53 threaded in the boss 46 is adapted to engage the hub 50 to lock the wheel 49 against turning movements.

To facilitate the measurement of the travel of the well 17, due to the actuation of the screw 26, the sleeve 25 is provided with a forwardly projecting lug 54 that extends into a vertical slot 55 in the scale plate 20. The lug 54 is provided with a horizontal cross line 56 that is adapted to aline with graduations on a graduated scale 57 positioned alongside the slot 55. The well 17 is so adjusted on the carrier 24 that the cross line 56 on the lug 54 registers with the zero graduation at the top of the scale 57 when the pressure upon the liquid in the tube 5 and well 17 is the same and the meniscus of the column is alined with the zero point 22. The extent of movement of the well necessary to bring the meniscus back to the zero point 22 when the column is displaced by pressure is indicated on the scale 57.

In order to obtain a more accurate measure of the travel of the well, the screw 26 has a wheel 58 fixed thereto adjacent its lower end which is provided with a graduated periphery that is exposed through a horizontal slot 59 in the lower portion of the scale plate 20. The graduated wheel 58 serves to indicate fractional turning movements of the screw 26. The pitch of the screw 26 is an aliquot part of a unit space on the scale 57 so that a predetermined number of turns of the screw 26 will cause a vertical movement of the carrier 24 and well 17 exactly corresponding to a unit space on the scale 57. If the mark 56 on the lug 54 is initially alined with the zero graduation of the scale 57, the mark 56 will be brought into registry with any other graduation of the scale 57 by a predetermined number of complete revolutions of the screw 26. The screw is initially so adjusted by means of the screw 39 that a zero mark on the wheel 58 registers with a mark 60 on the beveled edge of a dial plate 61 fixed to the housing beneath the exposed portion of the wheel 58 when the line 56 registers with the zero graduations of the scale 57 so that fractional parts of the spaces on the scale 57 will be indicated by the graduations on the wheel 58. To properly adjust the instrument for the accurate measurement of pressures, carrier 24 is initially positioned with the line 56 on the lug 54 registering with the zero graduation of the scale 57 as shown in Fig. 1 of the drawings and with the zero graduation on the wheel 58 registering with the mark 60 and the well 17 is positioned on the carrier so that the meniscus of the liquid column registers with the zero point 22 when the pressure in the tube 5 is the same as the pressure in the well 17. When differential pressures are applied the liquid column will move upwardly in the tube 5 and the approximate pressure will be indicated on the scale 21. The screw 26 may then be turned to quickly bring the graduation 56 on the lug 54 into alinement with a corresponding graduation on the scale 57. By such adjustment the meniscus of the liquid column will be brought close to the zero point 22 so that the meniscus may be alined with the zero point 22 by a small turning movement of the screw 26. The number of graduations on the wheel 58 through which it is necessary to turn the screw to aline the meniscus with the zero point 22 will accurately indicate the angular turning movement of the screw in addition to the number of complete turns which have been imparted thereto. If the pitch of the screw is one-tenth of a unit space on the scale 57, a complete turn of the screw will effect an adjustment corresponding to one-tenth of such unit space. If the wheel 58 is divided into one hundred spaces, a reading to a thousandth of the unit space may be made. Since the pitch of the screw 26 is an aliquot part of a unit space of the scale 57, the scale on the wheel 58 is utilized only to measure fractional parts of the spaces between graduations. If the space between successive graduations of the scale 57 is equal to the pitch of the screw 26, the scale on the wheel 58 will directly indicate the position of the line 56 with respect to the adjacent graduation on the scale 57.

It will be apparent that the present invention provides a convenient means of very accurately measuring pressures and that the device can be quickly and easily adjusted for proper measurement of the relative travel of the well and tube.

In measuring pressures above atmospheric the pipe 11 is vented to atmosphere and the fluid under pressure admitted through the pipe 19 is applied to the liquid in the well 17, causing the liquid to rise in the tube 5 above the zero point 22. A direct reading is indicated on the scale 21, but if a very accurate measurement is desired the well 17 will be adjusted downwardly by means of the hand wheel 45 to lower the meniscus of the liquid column into alinement with the zero graduation 22 and readings taken on the scale 57 and graduated wheel 58. If the pressure of the fluid connected through the pipe 19 be varied, accurate readings of the altered pressure may be had by merely adjusting the well 17 up or down to again register the meniscus of the liquid column with the zero graduation 22.

In measuring pressures below atmospheric the vacuum source is connected to the pipe 11 and the pipe 19 is vented to atmosphere.

In measuring differential pressure the higher pressure source is connected to the pipe 19 and the lower pressure source is connected to the pipe 11.

In each case an accurate measurement of pressure is obtained by adjusting the well 17 to aline the meniscus of the liquid column with the zero graduation 22.

It is to be understood that variations and modifications of the specific device herein shown and described for purposes of illustration, may be made without departing from the spirit of the invention.

What I claim is:

1. A manometer comprising a well and a connected manometer tube mounted for relative vertical travel, said tube having upright end portions and an intermediate portion inclined at a small angle to the horizontal, a scale plate fixed with respect to the tube and having a zero indicia alongside said inclined portion of the tube, a screw for causing relative vertical travel of said well and tube, means operable independently of said screw for effecting small relative vertical adjustments of the well and tube, and means for indicating the extent of relative travel of the well and tube due to operation of said screw.

2. A manometer comprising a well and a manometer tube connected to the well, said well and tube being mounted for relative vertical travel, said tube having upright end portions and an intermediate portion inclined at a small angle to the horizontal, a scale plate fixed with respect to the tube and having a zero indicia alongside said inclined portion of the tube, mechanism for causing relative vertical travel of said well and tube, means operable independently of said mechanism for effecting small relative vertical adjustments of the well and tube, and means for indicating the extent of relative travel of the well and tube due to the operation of said mechanism.

3. A manometer comprising a housing, a manometer tube mounted in fixed position in the housing, a carrier mounted for vertical travel in the housing, a screw for moving said carrier, a well mounted on said carrier and connected to said tube, means for adjusting said well vertically on said carrier, and means for turning said screw to move the carrier.

4. A manometer comprising a stationary support, a movable support mounted for vertical travel, a well carried by one of said supports, a manometer tube connected to said well and carried by the other of said supports, a vertical scale carried by one support alongside a portion of other support for indicating the relative position of the supports, a screw for actuating said movable support, the pitch of said screw being an aliquot part of a unit space on said scale, means for rotating said screw, means for indicating fractional turning movements of the screw, and means operable independently of said screw for effecting small relative vertical adjustments of said well and tube.

5. A manometer comprising a stationary support, a movable support mounted for vertical travel, a well carried by one of said supports, a manometer tube connected to said well and carried by the other of said supports, a vertical scale carried by one support alongside a portion of the other support for indicating the relative position of the supports, a screw for actuating said movable support, the pitch of said screw being an aliquot part of a unit space on said scale, a wheel attached to said screw and having peripheral graduations for indicating fractional turning movements of said screw, means for rotating said screw, and means operable independently of said screw for effecting small relative vertical adjustments of said well and tube.

6. A manometer comprising a housing, a scale plate adjacent the front of said housing, said scale plate having a vertical slot and a graduated scale alongside said slot, a vertically movable carrier in the housing having a lug extending into said slot, a manometer tube mounted in front of said plate said tube having a portion inclined at a small angle to the horizontal and said scale plate having a graduation alongside said inclined portion, a well mounted on said carrier and connected to said tube, means for adjusting said well vertically on said carrier, and means for moving said carrier vertically.

7. A manometer comprising a stationary support, a movable support mounted for vertical travel, a well carried by one of said supports, a manometer tube connected to said well and mounted on the other of said supports, said tube having a vertical upper portion and a portion intermediate its ends inclined at a small angle to the horizontal, a scale plate mounted behind said tube in fixed position with respect thereto, said plate having a graduated scale along the upper portion of said tube and a zero graduation intermediate the ends of the inclined portion of the tube, a mechanism for moving said movable support up and down, means operable independently of said mechanism for effecting small adjustments in the relative vertical positions of the well and tube, and means for indicating the extent of travel of said movable support from a predetermined position.

8. A manometer comprising a stationary support, a movable support mounted for vertical travel, a well carried by one of said supports, a manometer tube connected to said well and mounted on the other of said supports, said tube having a vertical upper portion and a portion intermediate its ends inclined at a small angle to the horizontal, a scale plate mounted behind said tube in fixed position with respect thereto, said plate having a graduated scale along the upper portion of said tube and a zero graduation intermediate the ends of the inclined portion of the tube, a screw for moving said movable support up and down, means operable independently of said screw for effecting small adjustments in the relative vertical positions of the well and tube, and means for indicating the extent of travel of said movable support from a predetermined position.

9. A manometer comprising a housing, a manometer tube mounted in fixed position in the housing adjacent the front thereof, said tube having a vertical upper portion and a portion intermediate its ends inclined at a small angle to the horizontal, a scale plate behind said tube, said plate having a graduated scale along the vertical upper portion of the tube and a zero graduation intermediate the ends of said inclined portion of the tube, a carrier mounted for vertical movements in said housing, a well mounted on said carrier and connected to said tube, means for adjusting said well vertically on said carrier to aline the meniscus of the liquid column in the tube with said zero graduation when pressures are equalized and said carrier is in a predetermined position, means for moving said carrier vertically, and means for indicating the amount of movement of said carrier from said predetermined position.

10. A manometer comprising a housing, a manometer tube mounted in fixed position in the housing adjacent the front thereof, said tube having a vertical upper portion and a portion intermediate its ends inclined at a small angle to the horizontal, a scale plate behind said tube, said plate having a graduated scale along the vertical upper portion of the tube and a zero graduation intermediate the ends of said inclined portion of the tube, a carrier mounted for vertical movements in said housing, a well mounted on said carrier and connected to said tube, means for adjusting said well vertically on said carrier to aline the meniscus of the liquid column in the tube with said zero graduation when pressures are equalized and said carrier is in a predetermined position, a screw for actuating said carrier, and means for indicating fractional turning movements of said screw.

11. A manometer comprising a housing, a scale plate mounted in the housing adjacent the front thereof, and having a vertical slot, a manometer tube mounted in said housing in front of said plate, said tube having a portion intermediate its ends inclined at a small angle to the horizontal and a vertical portion above said inclined portion, a graduated scale alongside the upper portion of said tube and having a zero graduation intermediate the ends of said inclined portion of the tube, a graduated scale extending along said slot, a carrier mounted for vertical movement in said housing, said carrier having a portion projecting into said slot and adapted to be alined with graduations of the scale alongside the slot, a well carried by said carrier and connected to said tube, a vertical screw for actuating said carrier, the pitch of said screw being an aliquot part of a unit space on the scale alongside the slot, a wheel connected to the screw and having peripheral graduations for indicating the angular position of the screw with respect to its axis, and means for adjusting the well vertically on said carrier to bring the liquid column in the tube to said zero graduation when the pressures on the liquid in the tube and well are the same and said carrier lug is alined with a graduation of the adjacent scale.

12. A manometer comprising a housing, a manometer tube mounted in the housing adjacent the front thereof said tube having a vertical upper portion and a portion intermediate its ends disposed at a small angle to the vertical, a scale plate mounted in the housing behind said tube, said plate having a vertical slot and a graduated scale extending along said slot, said plate also having a graduation intermediate the ends of said inclined portion of the tube, a carrier mounted in said housing for vertical movement and having a lug projecting into said slot and adapted to be alined with graduations of said scale, a well mounted on said carrier, a flexible tube connecting said well with the manometer tube, a screw connected to said carrier for actuating the same, the pitch of said screw being an aliquot part of a unit space on said scale, a screw mounted on said carrier for adjusting said well vertically on the carrier, and a wheel connected to said screw and provided with peripheral graduations for indicating fractional turning movements of the screw.

13. A manometer comprising a stationary support, a support mounted for vertical travel, a well carried by one support, a manometer tube connected to the well and mounted on the other support, said tube having a vertical upper portion and a portion inclined at a small angle to the horizontal, a screw for actuating the movable support, means including a scale for indicating the extent of vertical travel of the movable support, said scale being so calibrated with respect to the pitch of said screw that a unit space on said scale indicates a predetermined number of turns of said screw, a graduated wheel on said screw, means independent of said screw for effecting small relative vertical adjustments of the well and tube, and means for effecting small endwise adjustments of said screw.

14. In a device of the character described a stationary support, a support mounted for vertical travel, means including a scale for indicating the vertical travel of the movable support, a screw for actuating the movable support, a graduated wheel on said screw, and means for effecting small endwise adjustments of said screw.

15. A manometer comprising a housing, a manometer tube having a portion disposed at a small angle to the horizontal and an upright portion extending upwardly from said inclined portion, a scale plate carried by the housing alongside the tube, said scale plate having a graduation intermediate the ends of the inclined portion and graduations along the length of said upright portion, and a well connected to said tube and mounted for vertical adjustment with respect thereto.

16. A manometer comprising a housing, a manometer tube having a portion disposed at a small angle to the horizontal and an upright portion extending upwardly from said inclined portion, a scale plate carried by the housing alongside the tube, said scale plate having a graduation intermediate the ends of the inclined portion and graduations along the length of said upright portion, a well connected to said tube and mounted for vertical adjustment with respect thereto, and means for indicating positions of the well with respect to said tube.

ARTHUR A. HEJDUK.